US008839352B2

(12) United States Patent
Liu et al.

(10) Patent No.: US 8,839,352 B2
(45) Date of Patent: *Sep. 16, 2014

(54) FIREWALL SECURITY BETWEEN NETWORK DEVICES

(75) Inventors: Changming Liu, Cupertino, CA (US); Lee Chik Cheung, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/571,544

(22) Filed: Aug. 10, 2012

(65) Prior Publication Data

US 2012/0304251 A1 Nov. 29, 2012

Related U.S. Application Data

(63) Continuation of application No. 10/990,349, filed on Nov. 17, 2004, now Pat. No. 8,261,337.

(51) Int. Cl.
*H04L 29/08* (2006.01)
*G06F 15/16* (2006.01)
*H04L 29/06* (2006.01)
*G06F 21/60* (2013.01)

(52) U.S. Cl.
CPC ............ *H04L 63/02* (2013.01); *H04L 63/0227* (2013.01); *H04L 63/10* (2013.01); *G06F 21/60* (2013.01)
USPC .................................. 726/1; 713/150; 726/11

(58) Field of Classification Search
CPC ..... H04L 63/02; H04L 63/0227; H04L 63/10; G06F 21/60
See application file for complete search history.

(56) References Cited

U.S. PATENT DOCUMENTS

| 5,864,683 | A | 1/1999 | Boebert et al. | |
|---|---|---|---|---|
| 5,884,025 | A | 3/1999 | Baehr et al. | |
| 6,321,337 | B1 | 11/2001 | Reshef et al. | |
| 6,658,472 | B1* | 12/2003 | Greaves et al. | 709/225 |
| 6,760,768 | B2 | 7/2004 | Holden et al. | |
| 7,093,280 | B2 | 8/2006 | Ke et al. | |
| 7,095,716 | B1 | 8/2006 | Ke et al. | |
| 7,107,613 | B1 | 9/2006 | Chen et al. | |
| 7,161,904 | B2 | 1/2007 | Hussain et al. | |
| 7,185,209 | B2* | 2/2007 | Langworthy et al. | 713/193 |
| 7,366,101 | B1 | 4/2008 | Varier et al. | |
| 7,389,359 | B2 | 6/2008 | Jain et al. | |
| 7,822,024 | B2 | 10/2010 | Wybenga et al. | |
| 8,180,870 | B1* | 5/2012 | McDysan et al. | 709/223 |
| 2002/0083344 | A1 | 6/2002 | Vairavan | |
| 2003/0065944 | A1 | 4/2003 | Mao et al. | |

FOREIGN PATENT DOCUMENTS

EP 1363429 11/2003

OTHER PUBLICATIONS

Co-pending application of C. Liu et al., U.S. Appl. No. 10/990,349, filed Nov. 17, 2004, entitled "Firewall Security Between Network Device", 28 pages.

* cited by examiner

*Primary Examiner* — Fatoumata Traore
(74) *Attorney, Agent, or Firm* — Harrity & Harrity, LLP (57) ABSTRACT

A security device may be interconnected, via multiple links, between multiple network devices in a network. The firewall device may include multiple input interfaces that receive data units from a first network device destined for a second network device of the multiple network devices, identify a session associated with each of the data units, and process the data units in accordance with the identified sessions and a security policy.

16 Claims, 8 Drawing Sheets

FIREWALL SECURITY BETWEEN NETWORK DEVICES

RELATED APPLICATION

This application is a continuation of U.S. patent application Ser. No. 10/990,349 filed Nov. 17, 2004, the disclosure of which is incorporated herein by reference.

BACKGROUND OF THE INVENTION

1. Field of the Invention

Implementations consistent with principles of the invention relate generally to networks, and more particularly, to implementing firewall security between network devices in networks.

2. Description of Related Art

The advent and rise of the Internet has permitted the widespread use of electronic forms of communication across vast distances at high speed. The widespread use of electronic forms of communication has resulted in the need to protect local systems, or networks of systems, from unauthorized security threats. Currently, firewalls have been inserted between a local system (e.g., a host, a local area network (LAN), or server) and the Internet to establish a controlled link and to erect an outer security wall or perimeter. The aim of this perimeter is to protect the local system from Internet-based attacks and to provide a single choke point where security can be imposed. Existing firewalls, implemented between a local system and the Internet, thus protect the local system from network-based security threats, while at the same time affording access to the "outside world" via, for example, wide area networks and the Internet.

Existing firewalls typically, though, have been implemented at the "periphery" of the Internet, such as, for example, at servers connected to LANs, or at hosts connected directly to the Internet. Using firewalls at merely the periphery of the Internet, however, permits the proliferation of security attacks throughout other portions of the Internet, such as between network devices (e.g., routers or switches), that are not firewall protected.

SUMMARY OF THE INVENTION

One aspect consistent with principles of the invention is directed to a security device interconnected, via multiple links, between multiple network devices in a network. The security device may include multiple first interfaces configured to: receive data units from a first network device destined for a second network device of the multiple network devices, identify a session associated with each of the data units, and process the data units in accordance with the identified sessions and a firewall security policy.

A second aspect consistent with principles of the invention is directed to a security device interconnected, via multiple links, between multiple network devices in a network. The security device may include multiple first interfaces configured to: implement a firewall security policy for protecting against network-based security threats, receive data units from a first network device destined for a second network device of the multiple network devices, and process the data units according to the firewall security policy.

Another aspect consistent with principles of the invention is directed to a method that may include interconnecting a security device between a first network device and multiple other network devices in a network by coupling each output interface of the first network device to a different first interface of the security device. The method may further include mapping each first interface of the security device to a different second interface of the security device, and coupling each second interface to a different one of the multiple other network devices. The method may also include routing data units received from the first network device at the first interfaces, via respective second interfaces to which each of the first interfaces is mapped, to the multiple other network devices.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Consistent with principles of the invention implement, a firewall may be implemented between network devices in a network, such as, for example, the Internet. A firewall may be implemented within one or more firewall devices that may be interconnected between network devices in the network. A given firewall device may interconnect with each output interface of a given network device. The firewall devices may allow transparent data unit transmission between the network devices, while protecting against network-based security attacks through the implementation of firewall security policies at the one or more firewall devices. Implementation of firewalls in association with network devices imposes security protection at diverse locations in a network, and not just at the periphery of the network, thus serving to reduce security attacks throughout portions of the network in which firewall devices have been installed.

Exemplary Network

Figure 1A:
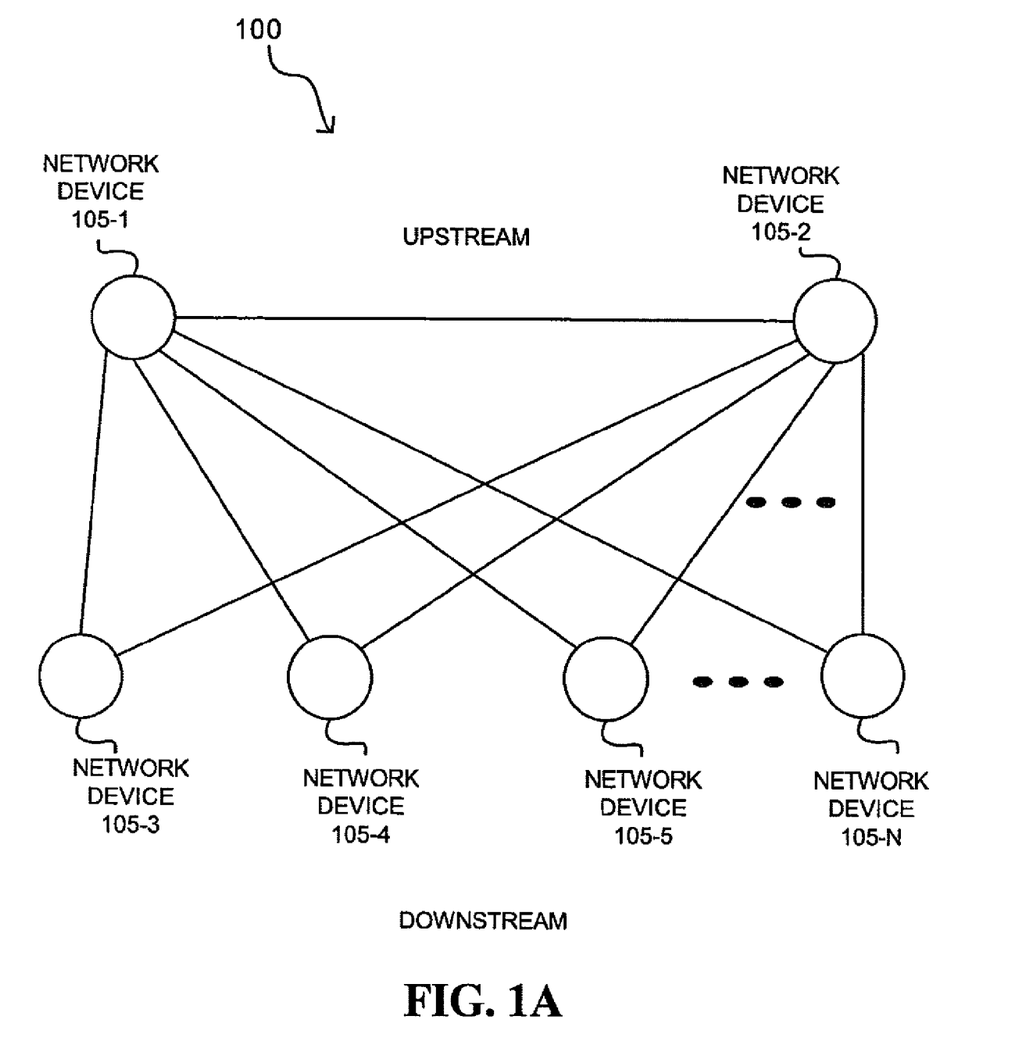
FIGS. 1A and 1B are diagrams of an exemplary network consistent with principles of the invention.

FIG. 1A illustrates an exemplary network 100 prior to implementation of firewall security between network devices consistent with principles of the invention. Network 100 may include network devices 105-1 through 105-N (collectively referred to as network devices 105 and referred to in the singular as network device 105-J, where J may include any number from 1 to N) interconnected via various links, where the links may include wired, wireless or optical connection links. Each of network devices 105 may include a router, a switch, a gateway, a hub, or other types of network devices that operate at intermediate locations within network 100

(i.e., not at endpoints, such as hosts or servers) and which store and forward data units towards network destinations.

Each of network devices 105 may route data units from a source (not shown) to a destination (not shown) in network 100. A data unit refers to any type of data, including, for example, packets, cells, datagrams, fragments of packets, fragments of datagrams or cells, or a combination of these types of data. Each network device 105-J may not implement firewall security for protecting each network device 105-J from various types of network-based security threats.

As shown in FIG. 1A, network devices 105-1 and 105-2 have been labeled as "upstream" network devices and network devices 105-3 through 105-N have been labeled as "downstream" network devices. Designation of network devices 105 as "upstream" or "downstream" involves an arbitrary selection of traffic traveling in one direction in network 100 as including "upstream" traffic and traffic traveling in the other direction as "downstream" traffic. Traffic, however, may traverse network 100 in any direction. In some implementations, downstream network devices 105-3 through 105-N may receive same session traffic from multiple upstream network devices via, for example, load balancing techniques. A session refers to a series of sequentially designated data units sent from a source to a destination in network 100.

Figure 1B:
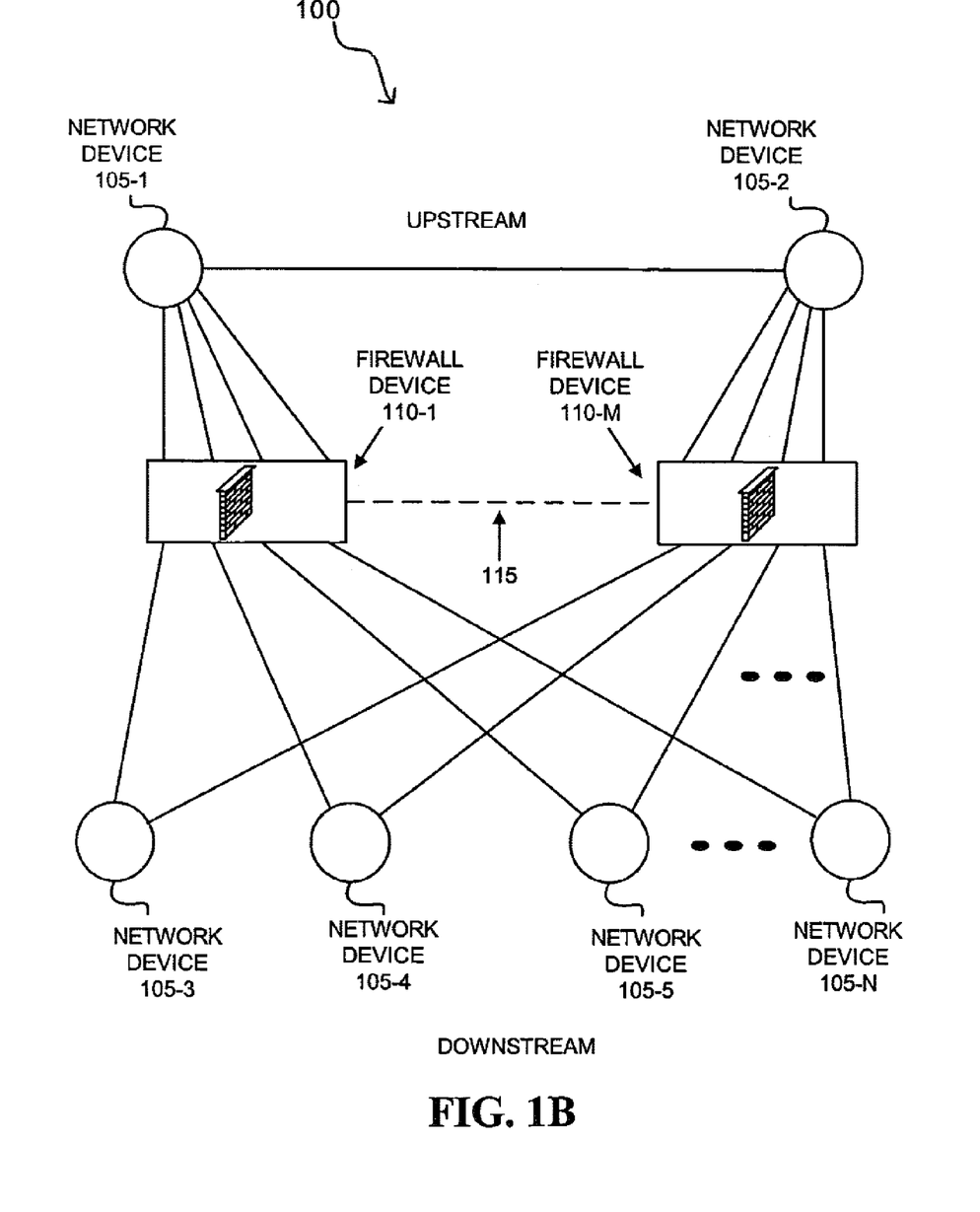

FIG. 1B illustrates the insertion of firewall devices 110-1 through 110-M (collectively referred to as firewall devices 110 and referred to in the singular as firewall device 110-K, where K may include any number from 1 to M) between network devices 105 of network 100. As shown in FIG. 1B, a firewall device 110-K may be inserted along each link between network devices 105 in network 100. For example, firewall device 110-1 may be inserted in the links between network device 105-1 and network devices 105-3, 105-4, 105-5 and 105-N. As another example, firewall device 110-M may be inserted along each link between network device 105-2 and network devices 105-3, 105-4, 105-5 and 105-N. Firewall devices 110 implement session firewall security that protects each network device from network-based security threats. Each of firewall devices 110 may communicate with every other firewall device in network 100 to synchronize session information via one or more links 115.

The number of elements illustrated in FIGS. 1A and 1B are provided for explanatory purposes only. A typical network may include more or fewer elements than are illustrated in FIGS. 1A and 1B and may be configured differently.

Exemplary Firewall Device

Figure 2A:
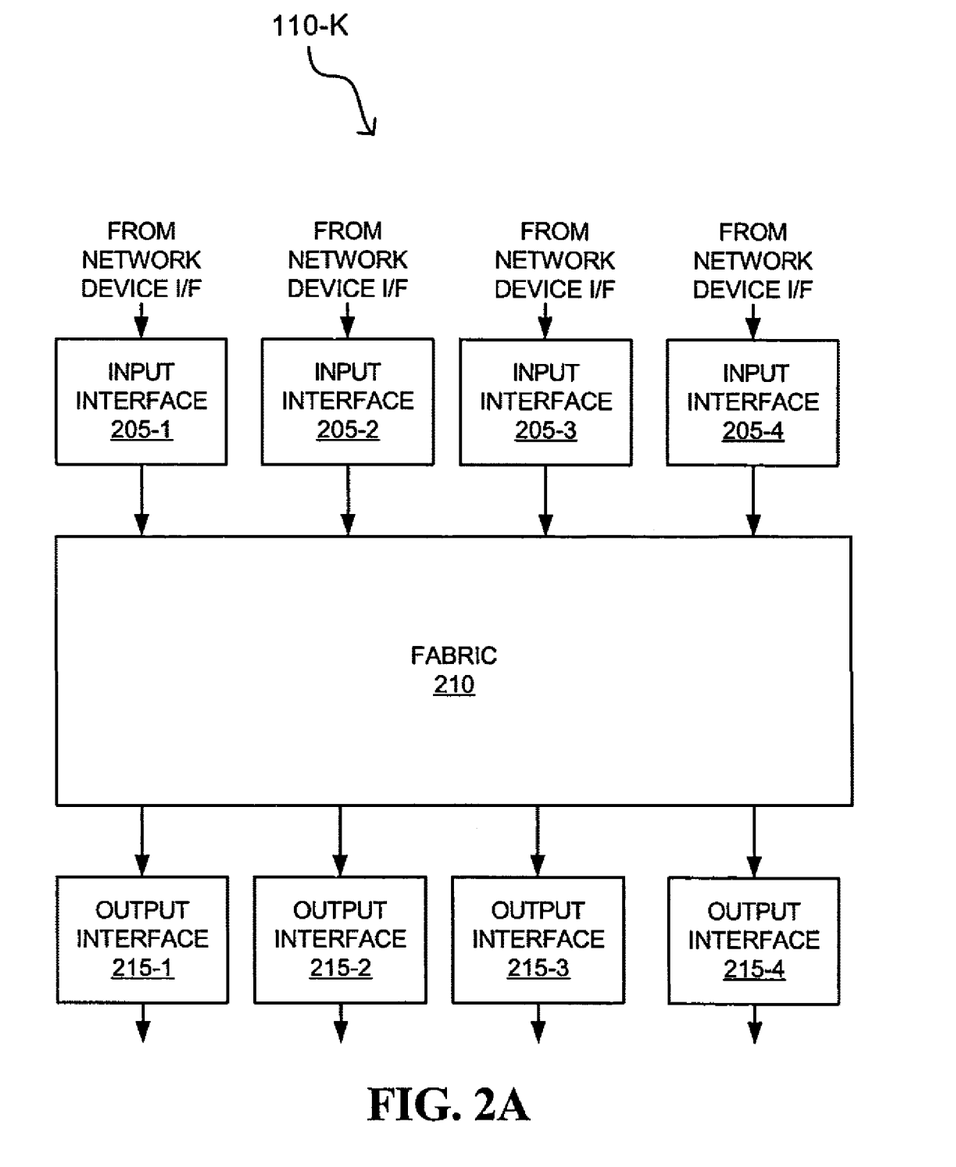
FIGS. 2A and 2B are diagrams of an exemplary firewall device of FIG. 1B consistent with principles of the invention.

FIG. 2A illustrates exemplary components of a firewall device 110-K consistent with principles of the invention. Firewall device 110-K receives incoming data units from an output interface of a network device 105-J, processes the data units in accordance with its firewall security policy, and outputs the data units on interfaces that lead to a "next hop" network device. In this manner, data units may pass, transparently, from one network device to another network device through the firewall implemented at firewall device 110-K.

As illustrated, firewall device 110-K may include multiple input interfaces 205-1 through 205-4 (collectively referred to as input interfaces 205 and referred to in the singular as input interface 205-L, where L may include any integer from 1 to 4), a switch fabric 210, and multiple output interfaces 215-1 through 215-4 (collectively referred to as output interfaces 215 and referred to in the singular as output interface 215-x, where x may include any number from 1 to 4). The number of input interfaces 205 and output interfaces 25 shown in FIG. 2A is for illustrative purposes only. Firewall device 110-K may include more, or fewer, interfaces than those shown. Each of input interfaces 205 may either set up switch fabric 210 to deliver a data unit to a corresponding output interface 215-x (e.g., input interface 205-1 to output interface 215-1, input interface 205-2 to output interface 215-2, etc.), or attach information to the data unit (e.g., output interface number) to allow switch fabric 210 to deliver the data unit to a corresponding output interface 215-x. Each of output interfaces 215 may queue data units received from fabric 210 and transmit the data units on to a "next hop" network device 105-J. Designation of the interfaces 205 or 215 of firewall device 110 as "input" or "output" interfaces involves an arbitrary selection of traffic traveling in one direction through firewall device 110. Data units may also be received at output interfaces 215 and be forwarded to input interfaces 205 via fabric 210.

Figure 2B:
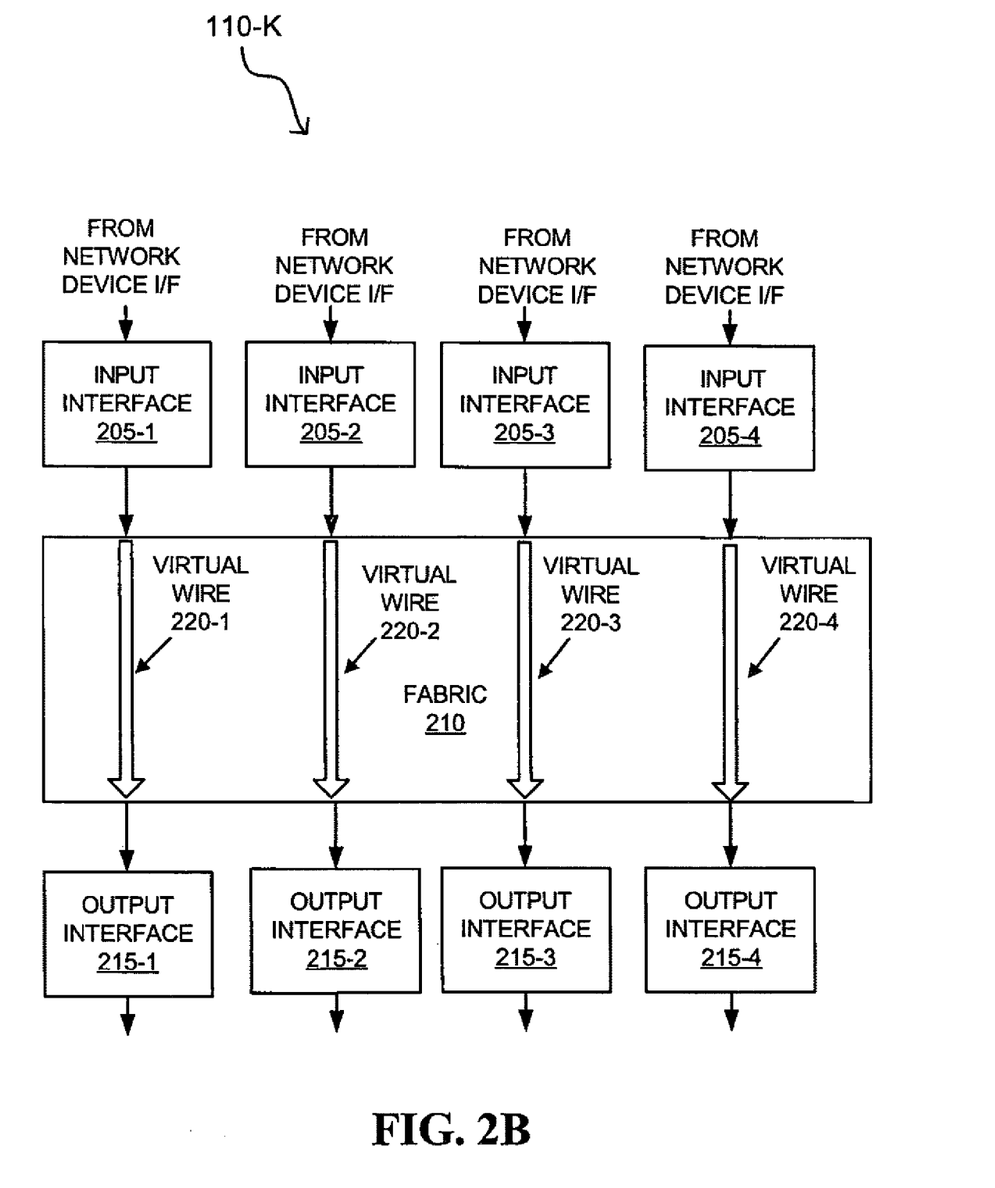

FIG. 2B illustrates implementation of "virtual wires" 220-1 through 220-4 (collectively referred to as virtual wires 220 and referred to in the singular as virtual wire 220-y, where y may include any integer from 1 to 4) in a firewall device 110-K consistent with principles of the invention. Each of virtual wires 220 includes a pair of physical interfaces in which data units received at one interface in the pair, including unicast, multicast, and broadcast data units, can only be forwarded to the other interface of the pair. Each of virtual wires 220 thus includes a dedicated path from an input interface 205-L to a corresponding output interface 215-x, or from an output interface 215-x to a corresponding input interface 205-L, that maintains an identical path from a source network device to a destination network device that existed prior to insertion of a firewall device 110-K between the two network devices. Insertion of a firewall device 110-K and use of virtual wires 220 preserves the original network topology and routing while, at the same time, providing security services. Due to the dedicated pairs of physical interfaces, each downstream network device from its own standpoint appears directly connected to an upstream network device, in spite of insertion of a firewall device 110-K in between.

Figure 2C:
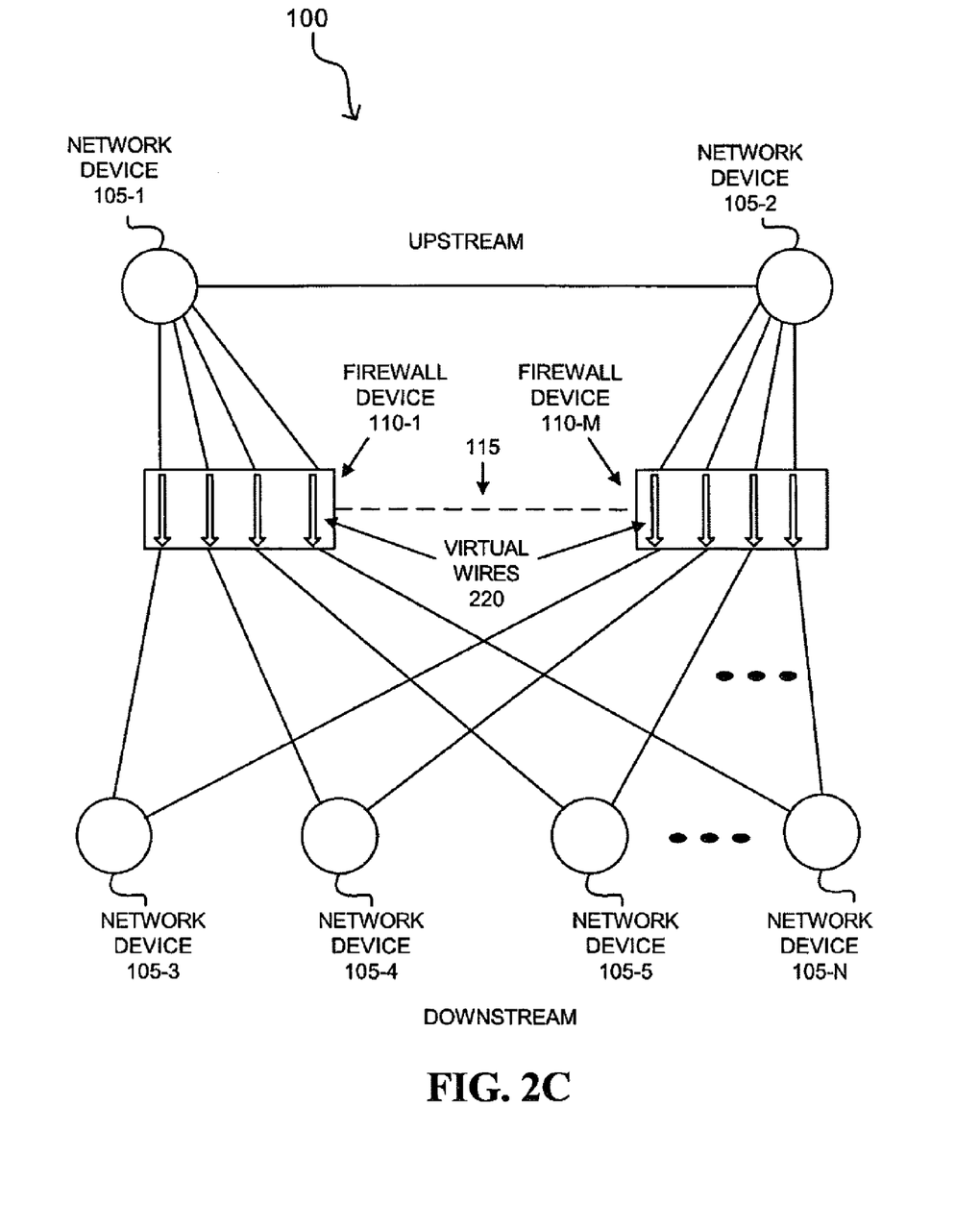
FIG. 2C is a diagram illustrating implementation of virtual wires within the network of FIG. 1B consistent with principles of the invention.

For illustrative purposes, FIG. 2C depicts the implementation of virtual wires 220 within firewall devices 110 of network 100. As shown in FIG. 2C, each virtual wire 220 provides a dedicated interconnection between a specific interface of a first network device (e.g., network device 105-1), and a specific interface of a second network device (e.g., network device 105-3).

Exemplary Session Table

Figure 3:
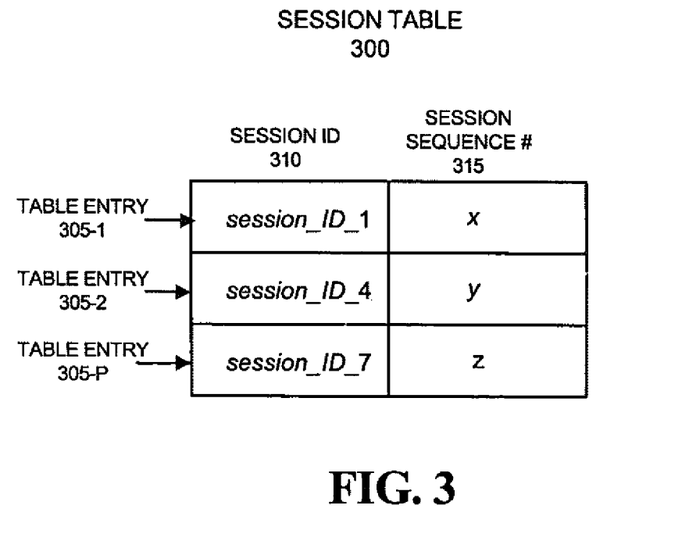
FIG. 3 is a diagram of an exemplary table that includes session information consistent with principles of the invention.

FIG. 3 illustrates an exemplary session table 300, associated with a firewall device 110-K, consistent with the principles of the invention. Session table 300 may be stored in a memory (not shown) within firewall device 110-K, or may be stored in a memory external to firewall device 110-K. Session table 300 may include one or more table entries 305-1 through 305-P (collectively referred to as table entries 305), each of which may include a session identifier 310 and a session sequence number 315. Session ID 310 may identify a series of data units sent between a source and destination in network 100. Session sequence number 315 may identify the sequence number associated with the most recent data unit of a session received at a firewall device 110-K.

Exemplary Data Unit Handling Process

Figure 4:
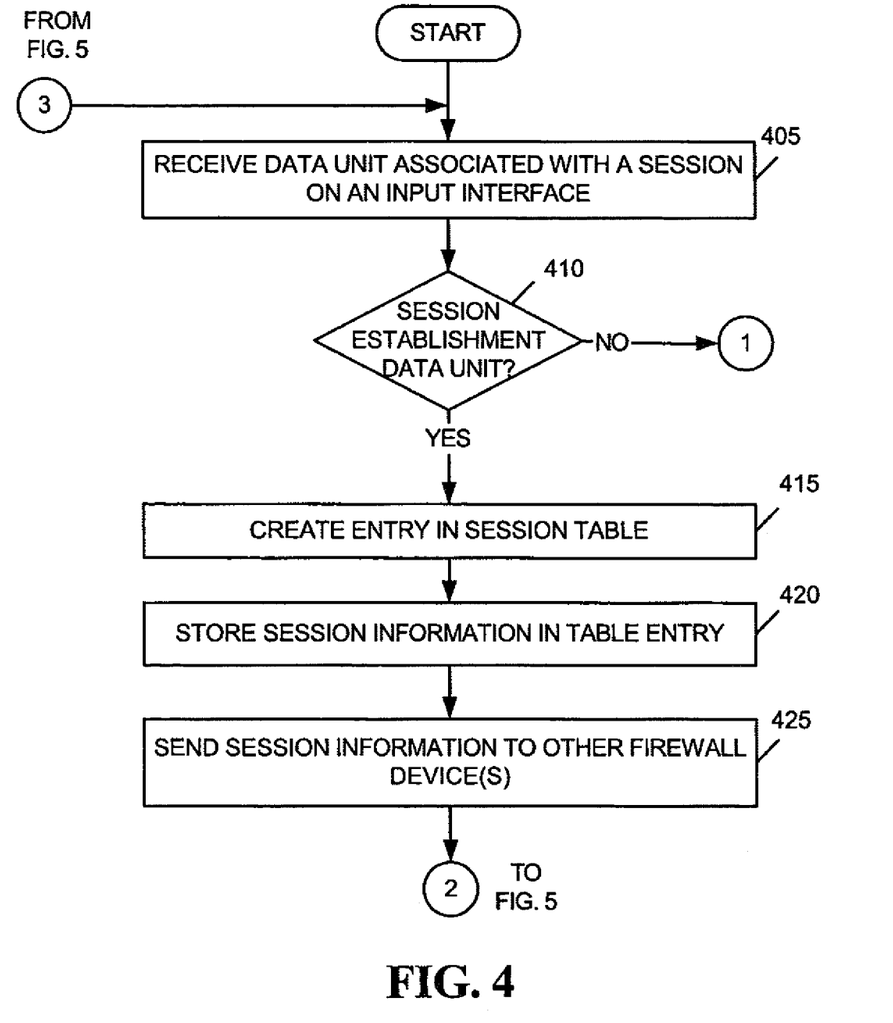
FIGS. 4-5 are flowcharts of an exemplary process for handling data units received at a firewall device according to an implementation consistent with principles of the invention.
Figure 5:
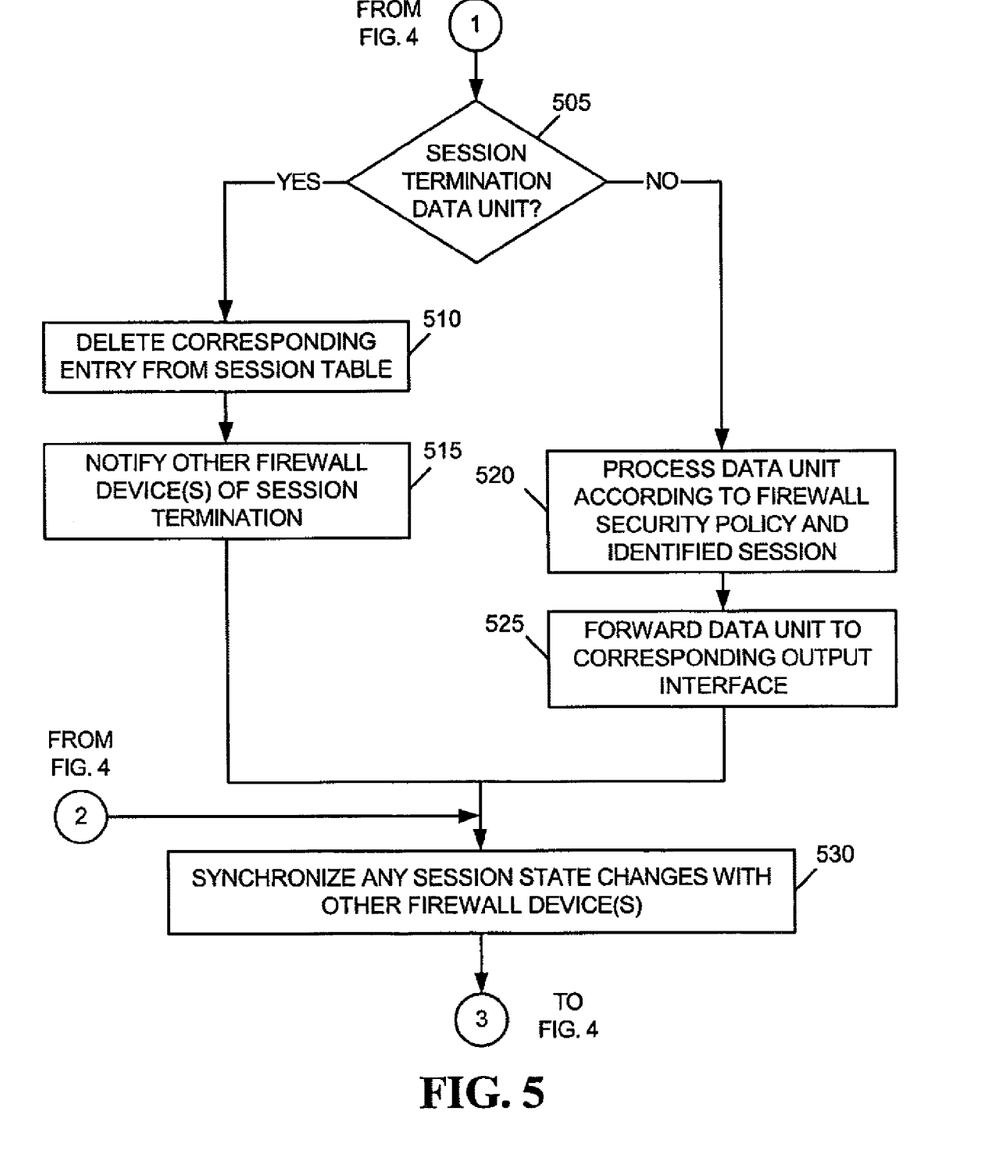

FIGS. 4-5 are flowcharts that illustrate an exemplary process, consistent with principles of the invention, for handling data units associated with sessions that are received at a firewall device 110-K. The exemplary process of FIGS. 4-5 may be implemented as software, hardware or firmware in an input interface 205-L, or an output interface 215-x, of a firewall device 110-K, or in any combination of software, hardware or firmware.

The exemplary process may begin with the receipt of a data unit, associated with a session, at an input interface 205-L or an output interface 215-x (act 405)(FIG. 4). The data unit may include header information that includes a source network address that identifies the source of the data unit, a destination network address that identifies the destination of the data unit in network 100, and a data unit sequence number that indicates a temporal placement of the data unit within a series of data units that comprise a session (i.e., a series of data units sent between the source and destination). Consistent with one aspect, the data unit may include a session establishment data unit, such as, for example, a Transmission Control Protocol (TCP) SYN data unit, that establishes a data session between a source and destination in network 100. Consistent with another aspect, the data unit may include a session termination data unit, such as, for example, a TCP FIN data unit, that terminates a session between a source and destination in network 100. Consistent with a further aspect, the data unit may include a conventional data "payload" sent from the source to the destination.

A determination may be made whether the received data unit includes a session establishment data unit (act 410). The session establishment data unit may include, for example, a TCP SYN data unit. If the received data unit does not include a session establishment data unit, the exemplary process may continue at act 505 below. If the received data unit does include a session establishment data unit, then a corresponding session entry 305 may be created in session table 300 (act 415). Session information may be stored in the session entry (act 420). The session information may include, for example, a session identifier 310 and a session sequence number 315. The session information may then also be sent to another firewall device(s) 110 in network 100 via link 115 (act 425). The session information sent to the other firewall device(s) 110 may notify the device(s) 110 of the establishment of the session.

If the data unit does not include a session establishment unit, then it may be determined whether the data unit includes a session termination data unit (act 505) (FIG. 5). The session termination data unit may include, for example, a TCP FIN data unit. If the data unit does include a session termination data unit, the corresponding entry 305 may be deleted from session table 300 (act 510) and any other firewall device(s) 110 may be notified of the session termination (act 515). The other firewall device(s) 110 may be notified via link(s) 115.

If the data unit does not include a session termination data unit, then the data unit may be processed by firewall device 110-K in accordance with the identified session and a firewall security policy (act 520). Each input interface 205-L, or output interface 215-x, of firewall device 110-K may enforce the firewall security policy using conventional techniques, such as, for example, conventional service control, direction control, user control, and behavior control techniques. Service control techniques determine the types of Internet services that can be accessed, either inbound or outbound. For example, the firewall may filter data units on the basis of Internet Protocol (IP) address and TCP port number. Direction control techniques determine the direction in which particular service requests may be initiated and allowed to flow through the firewall. User control techniques control access to a service according to which user is attempting to access it. Behavior control techniques control how particular services may be used. For example, the firewall may filter e-mail to eliminate spam, or it may enable external access to only a portion of the information on a local web server. Consistent with aspects of the invention, the firewall security policy may employ the above conventional techniques, and others not enumerated here.

The data unit may be forwarded to the corresponding output interface 215-x, or input interface 205-L (act 525). Only those data units that satisfy the firewall security policy may be forwarded to a corresponding output, or input, interface. Data units that fail to satisfy the firewall security policy may be deleted, or quarantined. The data unit may be forwarded from an input interface 205-L to an output interface 215-x via a corresponding virtual wire 220-y. If the data unit is received at an output interface 215-x, then the data unit may be forwarded to an input interface 205-L via a corresponding virtual wire 220-y. For example, as shown in FIG. 2B, a data unit received at input interface 205-1 may be forwarded to output interface 215-1 via virtual wire 220-1. Any session state changes noted by firewall device 110 may be synchronized with other firewall devices (act 530). For example, session age-out times, such as those that used in TCP, may elapse, and the corresponding "aged-out" sessions may be deleted from table 300. For example, if session_ID_1 is "aged-out," then the corresponding table entry 305 may be deleted from table 300.

Synchronization of session state changes between the firewall devices 110 in network 100 may permit the establishment of asymmetric sessions in network 100. A session is asymmetric if data units of the session flow through one firewall device in a downstream direction (e.g., from network device 105-1 towards network devices 105-3 through 105-N) while data units of the session flow in an upstream direction (e.g., from network device 105-5 towards network devices 105-1 or 105-2) through another firewall device. To support asymmetric sessions, session information needs to be resident in firewall devices 110-1 through 110-M to correctly process all session data units in accordance with the firewall security policy.

The exemplary process of FIGS. 4-5 may be repeated for each data unit received at firewall device 110-K.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although the implementations herein are described in terms of firewalls, any type of security device may be used without departing from the principles of the invention. Such security devices may include any type of security devices, including, in addition to firewalls, intrusion detection and prevention devices, virtual private network devices, security devices combining multiple types of security functionality, and combinations of security devices. While series of acts have been described in FIGS. 4-5, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method comprising:

establishing, by a first network device, a dedicated interconnection between a particular interface of a second network device and a particular interface of a third network device, the dedicated interconnection causing data received at a first interface of the first network device to be output from the first network device via a second interface of the first network device;

receiving, at the first interface of the first network device, data transmitted by the second network device toward the third network device;

processing, by the first network device, the data based on a security policy associated with the data, processing the data including:

determining that the data includes a data unit for establishing a data session between a source device and a destination device, storing session information associated with the data session based on the data including the data unit, the session information including an identifier that identifies the data session and a sequence number that identifies a position of the data relative to other data associated with the data session, and forwarding the session information to a fourth network device, the fourth network device including a dedicated interconnection between a pair of interfaces for forwarding data received from the third network device to a fifth network device; and outputting, by the first network device, the data to the third network device via the second interface of the first network device, the data being output via the second interface based on the dedicated interconnection being established, and the dedicated interconnection preserving a routing associated with transmitting the data between the second network device and the third network device that existed prior to the first network device being inserted between the second network device and the third network device.

2. The method of claim 1, where the first network device includes a first network security device, and where the fourth network device includes a second network security device.

3. The method of claim 1, where the second network device and the third network device operate at intermediate locations within a network.

4. The method of claim 1, further comprising:

interconnecting the first network device between the second network device and a plurality of downstream devices, the plurality of downstream devices including the third network device; and establishing a plurality of dedicated interconnections between interfaces of the second network device and interfaces of the plurality of downstream devices, the plurality of dedicated interconnections including the dedicated interconnection established between the particular interface of the second network device and the particular interface of the third network device.

5. The method of claim 4, where establishing the plurality of dedicated interconnections includes:

interconnecting each output interface of the second network device with a corresponding input interface of the first network device.

6. The method of claim 1, where the session information includes first session information, the method further comprising:

receiving, from the fourth network device, second session information associated with a particular data session; and where processing the data further includes:

determining that the data is associated with the particular data session based on the second session information.

7. A network device comprising:

a processor to:

establish a dedicated interconnection between a particular interface of an upstream network device and a particular interface of a downstream network device, the dedicated interconnection causing data received at a first interface of the network device to be output from the network device via a second interface of the network device, and the dedicated interconnection preserving a routing associated with transmitting data between the upstream network device and the downstream network device that existed prior to the network device being inserted between the upstream network device and the downstream network device, receive, at the first interface, data transmitted from the upstream network device toward the downstream network device, process the data based on a security policy associated with the downstream device, when processing the data, the processor being to:

determine that the data is for establishing a session between a source device and a destination device, store session information associated with the session, the session information including an identifier that identifies the session and a sequence number that identifies a position of the data relative to other data associated with the session, and forward the session information to another network device, the other network device including a dedicated interconnection between a pair of interfaces for forwarding data between the downstream network device and a second upstream network device, and output the data via the second interface based on the dedicated interconnection being established between the particular interface of the upstream device and the particular interface of the downstream device.

8. The network device of claim 7, where the upstream network device and the downstream network device operate at intermediate locations within a network associated with the network device.

9. The network device of claim 7, where, when establishing the dedicated interconnection, the processor is further to:

establish a plurality of virtual wires for transmitting data via a plurality of dedicated interconnections, the plurality of virtual wires being established between pairs of interfaces of the network device for transmitting data through the network device via the plurality of dedicated interconnections, the plurality of dedicated interconnections including the dedicated interconnection established between the particular interface of the upstream device and the particular interface of the downstream device, and the plurality of dedicated interconnections preserving a routing associated with transmitting data between the upstream network device and a plurality of downstream network devices that existed prior to the network device being inserted between the upstream network device and the plurality of downstream network devices.

10. The network device of claim 9, where the processor is further to:

interconnect the network device with each output interface of the upstream network device based on establishing the plurality of dedicated interconnections.

11. The network device of claim 7, where the session information includes first session information and, where the processor is further to:

receive, from the other network device, second session information associated with a particular data session, and where, when processing the data, the processor is further to:

determine that the data is associated with the particular data session based on the second session information.

12. A non-transitory computer-readable medium storing instructions, the instructions comprising:

one or more instructions that, when executed by a processor of a first network device, cause the processor to:

establish, between a particular interface of a second network device and a particular interface of a third network device, a dedicated interconnection, the dedicated interconnection causing data received at a first interface of the first network device to be output from the first network device via a second interface of the first network device, and the dedicated interconnection preserving a routing associated with transmitting data between the second network device and the third network device that existed prior to the first network device being inserted between the second network device and the third network device, receive, at the first interface of the first network device, data transmitted by the second network device toward the third network device, process the data based on a security policy associated with the data, the one or more instructions to process the data including:

one or more instructions that, when executed by the processor, cause the processor to:

determine that the data includes a data unit for establishing a data session between a source device and a destination device, store session information associated with the data session based on the data including the data unit, the session information including an identifier that identifies the data session and a sequence number that identifies a position of the data relative to other data associated with the data session, and forward the session information to a fourth network device, the fourth network device including a dedicated interconnection between a pair of interfaces for forwarding data received from the third network device to a fifth network device, and output the data via the second interface of the first network device based on establishing the dedicated interconnection.

13. The non-transitory computer-readable medium of claim 12, where the second network device and the third network device operate at intermediate locations within a network associated with the first network device.

14. The non-transitory computer-readable medium of claim 12, where the one or more instructions to establish the dedicated interconnection include:

one or more instructions that, when executed by the processor, cause the processor to establish a plurality of dedicated interconnections between interfaces of the second network device and interfaces of a plurality of third network devices, the plurality of third network devices including the third network device, the plurality of dedicated interconnections including the dedicated interconnection established between the particular interface of the second network device and the particular interface of the third network device, and the plurality of dedicated interconnections preserving a routing associated with transmitting data between the second network device and the plurality of third network devices that existed prior to the network device being inserted between the second network device and the plurality of third network devices.

15. The non-transitory computer-readable medium of claim 14, where the one or more instructions to establish the plurality of dedicated interconnections comprise:

one or more instructions that, when executed by the processor, cause the processor to interconnect the first network device with each output interface of the second network device based on establishing the plurality of dedicated interconnections.

16. The non-transitory computer-readable medium of claim 12, where the session information includes first session information, the instructions further comprising:

one or more instructions that, when executed by the processor, cause the processor to receive, from the fourth network device, second session information associated with a particular data session, and where the one or more instructions to process the data include:

one or more instructions that, when executed by the processor, cause the processor to determine that the data is associated with the particular data session based on the second session information.

* * * * *